(12) United States Patent
Mock et al.

(10) Patent No.: US 8,150,403 B2
(45) Date of Patent: Apr. 3, 2012

(54) RESERVATION OF MOBILE STATION COMMUNICATION RESOURCES

(75) Inventors: Von A. Mock, Boynton Beach, FL (US);
Mark A. Barros, Wellington, FL (US);
Zhuo-Ming Dai, Jiangsu (CN); Jorge L. Perdomo, Boca Raton, FL (US); Luis A. Pichardo, Miramar, FL (US); Xiao-Feng Zhu, Jiangsu (CN)

(73) Assignee: Motorola Mobility, Inc., Libertyville, IL (US)

( * ) Notice: Subject to any disclaimer, the term of this patent is extended or adjusted under 35 U.S.C. 154(b) by 71 days.

(21) Appl. No.: 11/421,014

(22) Filed: May 30, 2006

(65) Prior Publication Data
US 2007/0281674 A1    Dec. 6, 2007

(51) Int. Cl.
*H04W 72/00* (2009.01)
(52) U.S. Cl. .............. 455/450; 455/452.1; 455/464; 455/418; 370/329
(58) Field of Classification Search .......... 455/450, 455/452.1, 464, 418; 370/329
See application file for complete search history.

(56) References Cited

U.S. PATENT DOCUMENTS

| | | | |
|---|---|---|---|
| 5,724,417 A * | 3/1998 | Bartholomew et al. | 379/211.05 |
| 6,970,705 B2 | 11/2005 | Yoshimoto et al. | |
| 7,239,623 B2 * | 7/2007 | Burghardt et al. | 370/338 |
| 7,321,930 B2 * | 1/2008 | Ferguson et al. | 709/223 |
| 7,702,333 B2 * | 4/2010 | Walker et al. | 455/434 |
| 2004/0047282 A1 | 3/2004 | Fukuzawa | |
| 2004/0047292 A1 * | 3/2004 | du Crest et al. | 370/235 |
| 2005/0164681 A1 | 7/2005 | Jenkins et al. | |
| 2006/0133335 A1 * | 6/2006 | Garcia-Martin | 370/338 |
| 2007/0195751 A1 * | 8/2007 | Cai et al. | 370/352 |

OTHER PUBLICATIONS

AT&T, Advanced Communication Management Features, Important Info & FAQs, http://www.usa.att.com/callvantage/faqs/advanced_services.jsp, 11 pgs., Accessed May 30, 2006.
TimelyWeb software library, http://www.timelyweb.com/free/BroadcastByPhone-Autodialer__28095s.html, 2 pgs., Accessed May 30, 2006.
Calls, freeCRM.com, http://www.freecrm.com/call.html, 1 pg., Accessed May 30, 2006.
Send Word Now, http://www.sendwordnow.com, 1 pg., Accessed May 30, 2006.
Palm, Send Word Now for Treo Smartphones, http://www.palm.com/us/software/sendwordnow/, 3 pgs., Accessed May 30, 2006.
Palm, Send Word Now: Frequently Asked Questions, http://www.palm.com/us/software/sendwordnow/faq.html, 8 pgs., Accessed May 30, 2006.
International Search Report, PCT (Patent Cooperation Treaty), International Application No. PCT/US 07/64881, International Filing Date: Mar. 26, 2007, Priority Date: May 30, 2006, 8 pages.

* cited by examiner

*Primary Examiner* — Nghi Ly

(57) ABSTRACT

A method (300) for allocating mobile station resources. The method can include receiving a message (120) over a wireless communications network (110) from an authorized user requesting reservation of communication resources on the mobile station (105), and automatically reserving the mobile station communication resources in accordance with the request. Receiving the message over the wireless communications network can include receiving the message on a slave mobile station. The message can be received from a master mobile station (115). In one arrangement the message can include a mobile station calendar entry. The calendar entry can be received in response to initiating a call on the mobile station. The call can be, for example, a selective dynamic group (SDG) call.

20 Claims, 3 Drawing Sheets

RESERVATION OF MOBILE STATION COMMUNICATION RESOURCES

BACKGROUND OF THE INVENTION

1. Field of the Invention

The present invention generally relates to mobile communications and, more particularly, to allocation of mobile station resources.

2. Background of the Invention

Prior to the widespread implementation of mobile communications networks, parents had few options for staying in contact with their children. For example, when a parent urgently needed to communicate with a child that was not at home, the parent typically would call the houses of one or more friends. If the child was not located at any of his friend's houses, the parent oftentimes would search for the child by physically traveling to locations that the child was known to visit. The advent of mobile stations (e.g. cellular telephones and push-to-talk (PTT) telephones), however, has provided a much more convenient means for parents to keep track of their children's activities and whereabouts. Indeed, many parents even provide their children with their own mobile stations.

Notwithstanding the assistance mobile communications has provided to parents in attempting to maintain contact with their children, the use of mobile communications is not infallible at achieving this goal. For example, children sometimes become involved in long telephone conversations on their mobile stations. In the meantime, they often ignore other calls. Children also sometimes forget to turn on their mobile stations. Thus, even if a child has his own mobile station, his parents still may have difficulty contacting him. It therefore would be beneficial to provide to parents a means for improving the probability of actually being able to contact a child via the child's mobile station.

SUMMARY OF THE INVENTION

The present invention relates to a method for allocating mobile station resources. The method can include receiving a message over a wireless communications network from an authorized user requesting reservation of communication resources on the mobile station, and automatically reserving the mobile station communication resources in accordance with the request.

Receiving the message over the wireless communications network can include receiving the message on a slave mobile station. The message can be received from a master mobile station. In one arrangement the message can include a mobile station calendar entry. The calendar entry can be received in response to initiating a call on the mobile station. The call can be, for example, a selective dynamic group (SDG) call.

The method also can include blocking the call or forwarding the call to voice mail in response to receiving a call from an unauthorized user while the communication resources are reserved. In another arrangement, responsive to receiving a call from the authorized user while communication resources are reserved, a call session on the mobile station can be automatically terminated. In yet another arrangement, responsive to receiving a call from the authorized user while communication resources are reserved, certain mobile station features can be automatically terminated or suspended. Automatically terminating or suspending certain mobile station features can include terminating or suspending a multimedia download, multimedia playback or GPS.

The present invention also relates to a method for allocating mobile station resources. The method can include sending a message over a wireless communications network from an authorized user requesting reservation of communication resources on the mobile station, the message automatically reserving the mobile station communication resources in accordance with the request. Sending the message over the wireless communications network can include sending the message to a slave mobile station. The message can be sent from a master station. The message can include a mobile station calendar entry. The calendar entry can be sent in response to initiating a call on the mobile station. The call can be a SDG call. In one arrangement, the message can be sent to a storage location to be stored until a communication link with the mobile station is available.

Another embodiment of the present invention relates to a mobile station which includes a communications adapter that receives a message over a wireless communications network from an authorized user requesting reservation of communication resources on the mobile station. The mobile station also includes a controller that automatically reserves the mobile station communication resources in accordance with the request. In response to receiving a call from an unauthorized user while the communication resources are reserved, the controller can block the call or forward the call to voice mail. The controller also can automatically terminate a call session on the mobile station in response to receiving a call from the authorized user while communication resources are reserved.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method and a system for allocating mobile station communication resources. In particular, an authorized user can send a message to a target mobile station. The message can reserve the mobile station's communication resources for receiving a call to be placed by the user, or transmitting a call to the user, during a selected time frame. In one arrangement, calls placed to the mobile station from other users can be blocked or forwarded to voice mail during the reserved time frame. In another arrangement, a call from the user can be given priority over other call sessions and device features (e.g. video or music download/playback, a game, a global positioning satellite (GPS) service, a GPS fix attempt, and the like) and such other call sessions or device features can be automatically suspended or terminated when the call from the user is received.

Figure 1:
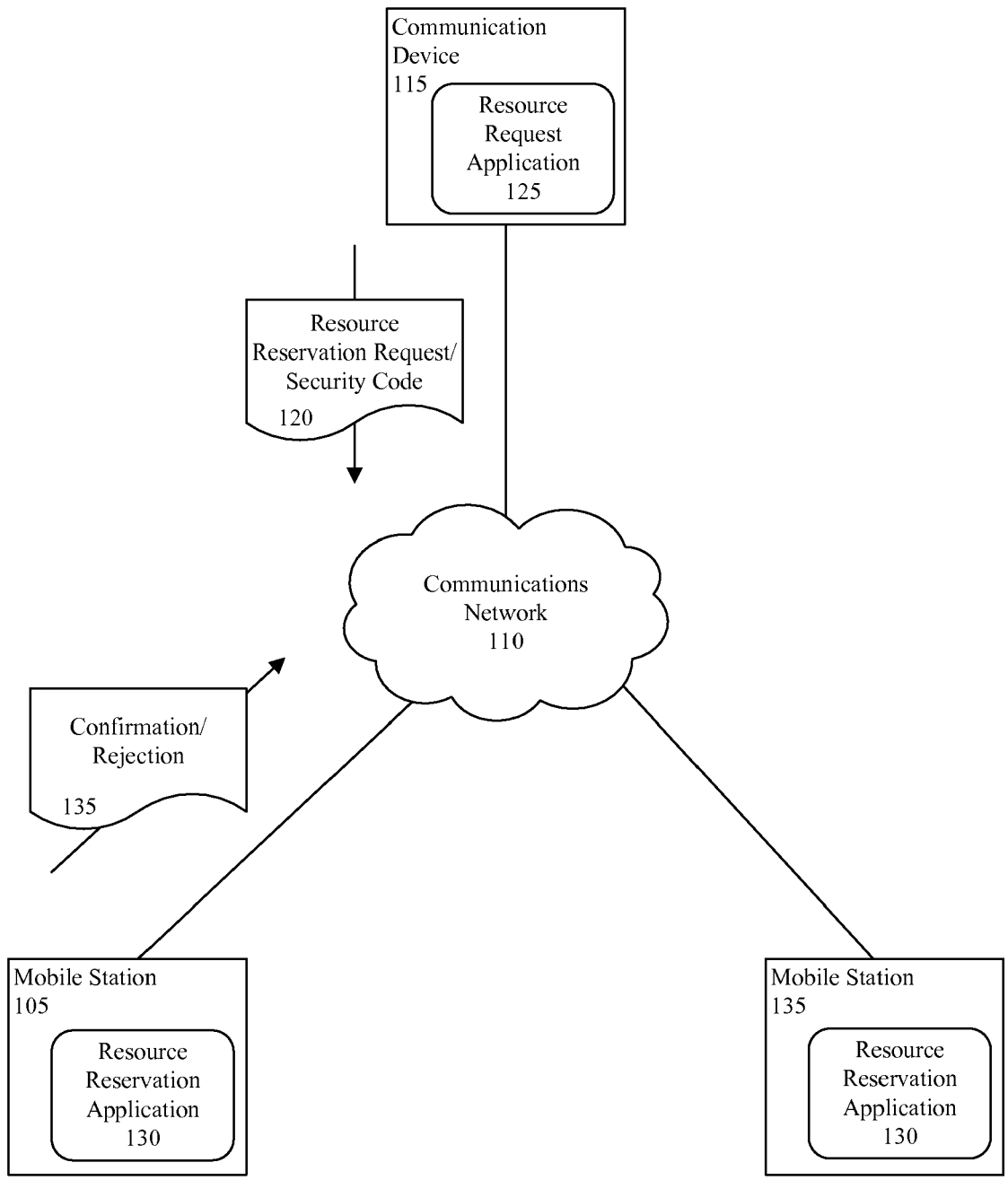
FIG. 1 depicts a communications system that is useful for understanding the present invention.

FIG. 1 depicts a communications system 100 that is useful for understanding the present invention. The communications system 100 can include a mobile station 105. The mobile station 105 can be a mobile telephone, such as a cellular telephone or a push-to-talk (PTT) telephone, a personal digital assistant (PDA), a mobile computer, or any other mobile device that may be used to communicate via a communications network 110.

The communications network 110 can include the Internet, the World Wide Web, a wide area network (WAN), a local area network (LAN), a cellular communications network, a dispatch communications network, a public switched telephone network (PSTN), or any other communications network over which communications can be propagated. In that regard, the communications network 110 can include wired and/or wireless communication links.

The system 100 also can include a communication device 115. The communication device 115 can be a mobile station or a non-mobile communication device. For example, the communication device 115 can be a telephone, a mobile telephone, such as a cellular telephone or a PTT telephone, a PDA, a computer, or any other device that may be used to communicate with the mobile station 105 via the communications network 110.

In one arrangement, the communication device 115 can be a master device and the mobile station 105 can be a slave device that is associated with the communication device 115. For example, the communication device 115 can be associated with a primary account established with a communications provider and the mobile station 115 can be associated with a communications account that is a dependent of the primary account. Accordingly, a user associated with the primary account can be provided with certain administrative privileges on the mobile station 105, for instance to reserve communication resources on the mobile station 105.

In operation, the communication device 115 can propagate to the mobile station 105, via the communications network 110, a message 120 containing a resource reservation request. The message 120 can be generated by a resource request application 125 instantiated on the communication device 115. The resource reservation request can indicate which mobile station resources are to be reserved and when the resources are to be reserved. The message 120 also can include an identifier corresponding to a user authorized to reserve resources on the mobile station 105. Further, the message 120 can include a security code, such as a pass code, key and/or any other information compatible with a security protocol implemented on the mobile station 105. The message 120 can be propagated from the communication device 115 to the mobile station 105 as one or more packets or frames.

In another arrangement, the resource reservation request can be a calendar request transmitted in the message 120. In such an arrangement, the resource request application 125 can be included as a component of a calendar application instantiated on the communication device 115. The calendar request can indicate a master/slave relationship between the communication device 115 and the mobile station 105 along with an authentication mechanism.

The calendar request can be processed by a resource reservation application 130 instantiated on the mobile station 105. The resource reservation application 130 can be, for example, a component of a calendar application instantiated on the mobile station 105. In response to receiving the message 120 containing the calendar request, the resource reservation application 130 can verify that the message 120 was sent from the communication device 115 and that the communication device 115 is a master device with respect to the mobile station 105. The resource reservation application 130 also can implement any other suitable authentication/security processes.

Once the resource reservation application 130 has authenticated the calendar request, the resource reservation application 130 can set a calendar appointment to allocate requested resources of the mobile station 105 to the user of the communication device 115 during a time frame indicated in the calendar request. If the calendar request cannot be authenticated by the mobile station 105, the mobile station 105 can reject the calendar request.

In response to receiving the message 120, the mobile station 105 can provide a notification to a user of the mobile station 105 indicating that reservation of the mobile station resources has been requested and indicating whether the reservation was allowed. The notification can indicate which mobile station resources have been reserved, when the resources are reserved, and who reserved the resources. In one arrangement, the notification can be provided as a calendar entry automatically entered into the calendar application. The resource reservation application 130 also can automatically generate a message 135 to the communication device 115 confirming whether the resource reservation has been allowed or rejected.

In another arrangement, rather than transmitting the resource reservation request, calendar request, user identifier, security code and/or any other authentication information to the mobile station 105, such information can be entered directly into the mobile station 105 via a user interface. For example, the information can be entered directly into the calendar application instantiated on the mobile station 105.

In response to receiving the resource reservation request and authenticating the request, the mobile station 105 can automatically reserve selected resources in accordance with the resource reservation request. For example, the mobile station 105 may reserve its communication resources for a requested time frame. Further, the level of resource reservation can be user selectable. For instance, the request can indicate to the mobile station 105 to block all incoming calls during the selected time frame and direct such calls to voice mail. The request also can indicate that calls from the mobile station 105 can only be placed to the user or to one or more specified numbers. In another arrangement, the request can indicate to the mobile station to give calls from the user priority over other call sessions and device features (e.g. video or music download/playback, GPS and the like) and such other call sessions or device features can be automatically suspended or terminated when the call from the user is received.

In one aspect of the inventive arrangements, the resource reservation request can be sent to a plurality of mobile stations 105, 130. Such an arrangement can be advantageous for the scheduling of conference calls. For example, a user of the communication device 115 can select a group of conference call attendees from a list of contacts contained on the communication device 115 and schedule a calendar event which includes the selected attendees.

In such an arrangement, the message 120 can be simultaneously sent to a plurality of mobile stations that are associated with the conference call attendees, for instance mobile stations 105, 135. The message 120 can be sent by highlighting the scheduled calendar event in the calendar application instantiated on the communication device 115, and selecting a single key or button to transmit the message 120. A calendar entry contained in the message 120 then can be automatically entered into a calendar application on each of the mobile stations 105, 135. As with the mobile station 105, the mobile station 135 also can include a resource reservation application 130.

In an arrangement in which the communication device 115 is a PTT telephone, after being selected, the message 120 can be automatically sent to the selected recipient(s) the next time the communication device's PTT button is depressed to establish a communication link, for example to initiate a call. The message 120 then can be stored at a suitable storage location, for instance at a basestation, until a communication link with the recipient is available to deliver the message 120. For instance, if the mobile station 105 also is a PTT telephone, the message 120 can be automatically delivered to the mobile station 105 the next time the mobile station's PTT button is depressed to establish a communication link, for instance to initiate a call.

Figure 2:
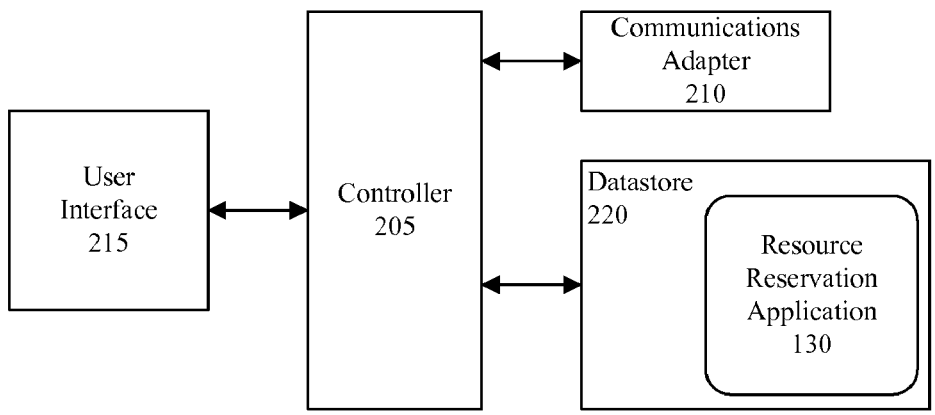
FIG. 2 is a block diagram of a mobile station that is useful for understanding the present invention.

FIG. 2 depicts a block diagram of an example of the mobile station 105 that is useful for understanding the invention. The mobile station 105 can include a controller 205. The controller 205 can comprise, for example, a central processing unit (CPU), a digital signal processor (DSP), an application specific integrated circuit (ASIC), a programmable logic device (PLD), a plurality of discrete components that cooperate to process data, and/or any other suitable processing device.

The mobile station 105 also can include a communications adapter 210 with which the mobile station 105 communicates with other devices via the communications network. The communications adapter 210 can be any communications adapter compatible with the communications network to which the mobile station 105 is linked. For example, the communications adapter 210 can include a transceiver that communicates signals in accordance IEEE 802 wireless communications, WPA, WPA2, GSM, TDMA, CDMA, WCDMA, Bluetooth, direct wireless communication, TCP/IP, or from any other communications protocol supported by the communications network.

The mobile station 105 also can include a user interface 215. The user interface 215 can include a display, audio input/output transducers, image capture devices, one or more user input devices, for example buttons, a keypad, touch screen or the like, and/or any other devices which facilitate user interaction with the mobile station 105.

A datastore 220 also can be provided. The datastore 220 can include a magnetic storage medium, an electronic storage medium, an optical storage medium, a magneto-optical storage medium, or any other storage medium suitable for storing digital information. In one arrangement, the datastore 220 can be integrated into the controller 205.

The resource reservation application 130 can be contained on the datastore 220. The resource reservation application 130 can be executed by the controller 205 to reserve resources on the mobile station 105, such as communication resources, and implement other processes described herein.

Figure 3:
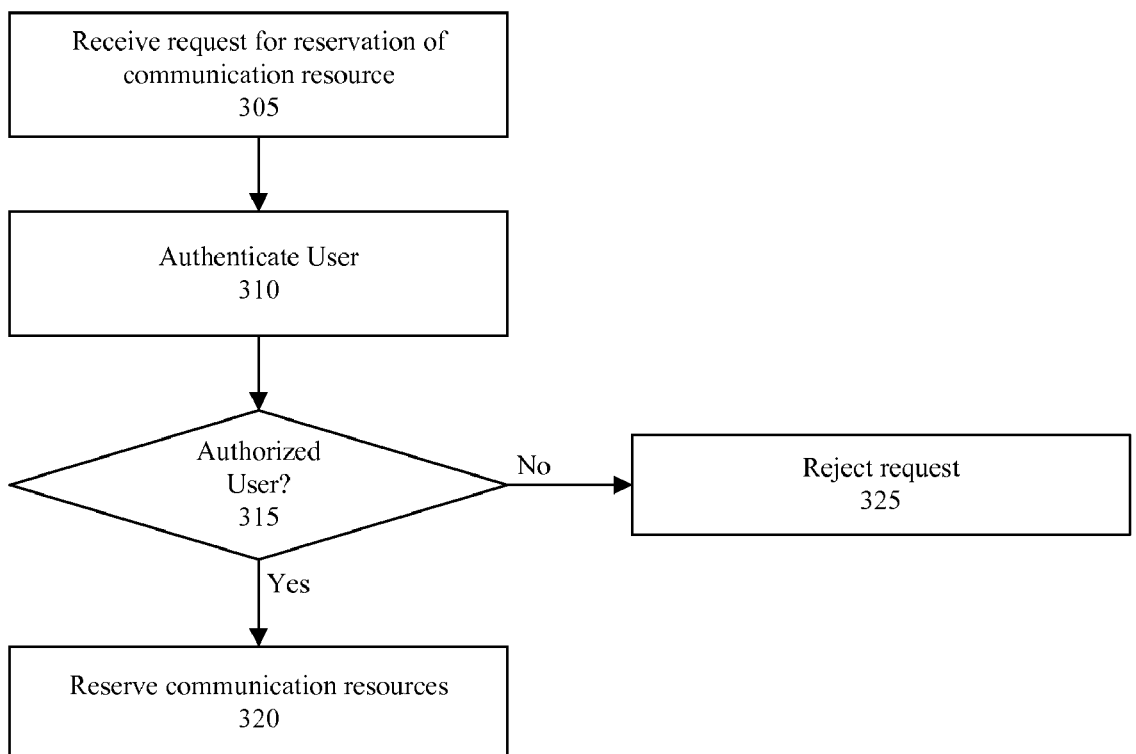
FIG. 3 is a flowchart illustrating a method for reserving communication resources that is useful for understanding the present invention.

FIG. 3 is a flowchart illustrating a method 300 for reserving communication resources that is useful for understanding the present invention. At step 305 a request for reservation of a communication resource can be received on a mobile station. Proceeding to step 310, the user can be authenticated. Referring to decision box 315, if the user is an authorized user, the process can continue to step 320 and the communication resources can be reserved in accordance with the request. If, however, the user is not an authorized user or the authentication otherwise fails, the process can proceed to step 325 and the request for reserving communication resources can be rejected.

Figure 4:
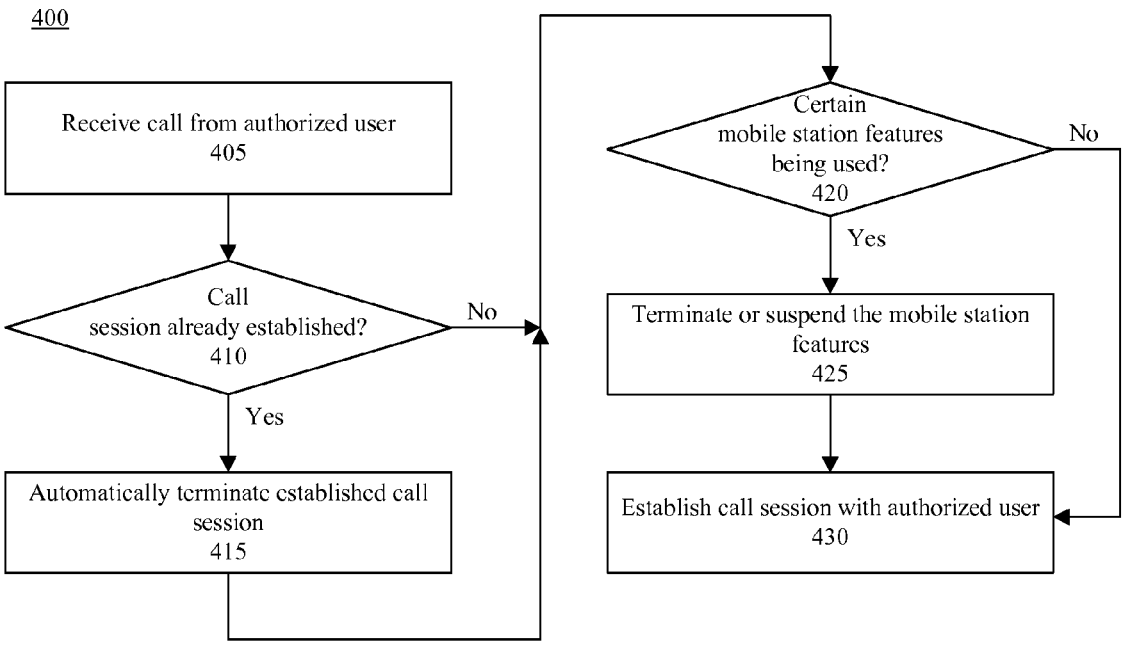
FIG. 4 is a flowchart illustrating a method for establishing a call session with an authorized user that is useful for understanding the present invention.

FIG. 4 is a flowchart illustrating a method 400 for establishing a call session with an authorized user that is useful for understanding the present invention. At step 405 a call can be received on a mobile station from an authorized user. At decision box 410, a determination can be made as to whether a call session is already established on the mobile station. If a call session is already established, at step 415 such call session can be terminated.

Referring to decision box 420, a determination can be made as to whether certain mobile station features, such as those that may interfere with the call from the authorized user, are being used on the mobile station. If so, such mobile station features can be terminated or suspended at step 425. Proceeding to step 430, on the mobile station a call session can be established with the authorized user.

Figure 5:
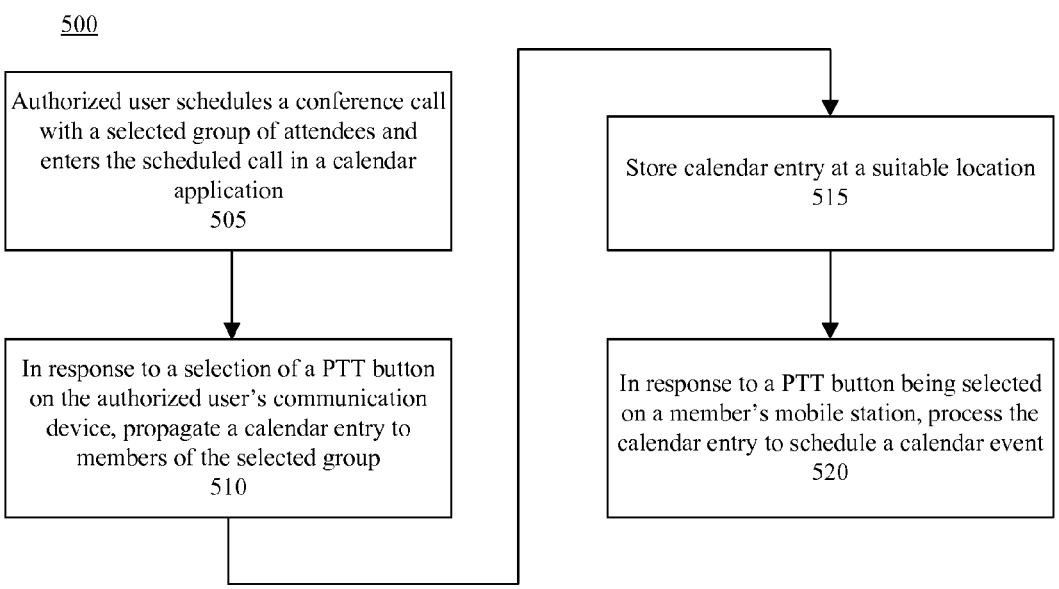
FIG. 5 is a flowchart illustrating a method for reserving communication resources with a plurality of conference call attendees that is useful for understanding the present invention.

FIG. 5 is a flowchart illustrating a method 500 for reserving communication resources with a plurality of conference call attendees that is useful for understanding the present invention. At step 505 an authorized user can schedule a conference call with a selected group of attendees and can enter the scheduled call in a calendar application. Proceeding to step 510, in response to selection of a PTT button on the authorized user's communication device to initiate a call, a calendar entry can be propagated to members of the selected group. In one arrangement, a temporary selective dynamic group (SDG) that contains all members of the group can be created and the call can be an SDG call can be placed to the group. At step 515, the calendar entry can be stored at a suitable location, for example a basestation. Continuing to step 520, in response to a PTT button being selected on a member's mobile station, the calendar entry can be sent to, and received by, the member's mobile station and processed to schedule a calendar event. For example, the calendar entry can be processed in response to a private call or an SDG call being initiated on the member's mobile station.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method for allocating mobile station resources, comprising:
    receiving on a mobile station a message over a wireless communications network from another communication device associated with a first person, the first person having administration privileges on the mobile station and the message requesting reservation of communication resources on the mobile station, the message indicating at least one person with whom communications to or from the mobile station are allowed and when the communication resources are to be reserved, wherein the at least one person is selected from a group consisting of the first person who sent the message, and at least a second person to whom communications placed by the mobile station or from whom communications received by the mobile station are allowed; and
    automatically reserving the communication resources on the mobile station in accordance with the request to provide that communications to or from the at least one person are given priority over other features of the mobile station when the communication resources are reserved.

2. The method of claim 1, further comprising:
    responsive to receiving a call from the other communication device while the communication resources are reserved, performing at least one call handling operation selected from the group consisting of blocking the call and forwarding the call to voice mail.

3. The method of claim 1, further comprising:
    responsive to receiving a call from the other communication device while communication resources are reserved, automatically terminating a call session on the mobile station.

4. The method of claim 1, further comprising:
    responsive to receiving a call from the other communication device while communication resources are reserved, automatically terminating or suspending certain mobile station features.

5. The method of claim 4, wherein automatically terminating or suspending certain mobile station features comprises terminating or suspending at least one mobile station feature selected from the group consisting of a multimedia download, multimedia playback, a game, a GPS service and a GPS fix attempt.

6. The method of claim 1, wherein receiving the message over the wireless communications network comprises receiving the message on a slave mobile station.

7. The method of claim 1, wherein receiving the message over the wireless communications network comprises receiving the message from a master mobile station.

8. The method of claim 1, wherein receiving the message over the wireless communications network comprises receiving a mobile station calendar entry.

9. The method of claim 1, wherein receiving the message over the wireless communications network comprises receiving a mobile station calendar entry in response to initiating a call on the mobile station.

10. The method of claim 1, wherein receiving the message over the wireless communications network comprises receiving a mobile station calendar entry in response to initiating a selective dynamic group (SDG) call on the mobile station.

11. A method for allocating mobile station resources, comprising:
    sending a message over a wireless communications network from another communication device associated with a first person, the first person having administration privileges on the mobile station and the message requesting reservation of communication resources on the mobile station, the message indicating at least one person with whom communications to or from the mobile station are allowed and when the communication resources are to be reserved, wherein the at least one person is selected from a group consisting of the first person who sent the message, and at least a second person to whom communications placed by the mobile station or from whom communications received by the mobile station are allowed; and
    automatically reserving the communication resources on the mobile station in accordance with the request to provide that communications to or from the at least one person are given priority over other features of the mobile station when the communication resources are reserved.

12. The method of claim 11, wherein sending the message over the wireless communications network comprises sending the message to a slave mobile station.

13. The method of claim 11, wherein sending the message over the wireless communications network comprises sending the message from a master mobile station.

14. The method of claim 11, wherein sending the message over the wireless communications network comprises sending a mobile station calendar entry.

15. The method of claim 11, wherein sending the message over the wireless communications network comprises sending a mobile station calendar entry in response to initiating a call on the mobile station.

16. The method of claim 11, wherein sending the message over the wireless communications network comprises sending a mobile station calendar entry in response to initiating a selective dynamic group (SDG) call on the mobile station.

17. The method of claim 11, wherein sending the message over the wireless communications network comprises sending the message to a storage location to be stored until a communication link with the mobile station is available.

18. A mobile station comprising:
a communications adapter that receives a message over a wireless communications network from another communication device associated with a first person, the first person having administration privileges on the mobile station and the message requesting reservation of communication resources on the mobile station, the message indicating at least one person with whom communications to or from the mobile station are allowed and when the communication resources are to be reserved, wherein the at least one person is selected from a group consisting of the first person who sent the message, and at least a second person to whom communications placed by the mobile station or from whom communications received by the mobile station are allowed; and
a controller that automatically reserves the communication resources on the mobile station in accordance with the request to provide that communications to or from the at least one person are given priority over other features of the mobile station when the communication resources are reserved.

19. The mobile station of claim 18, wherein the controller performs at least one call handling operation selected from the group consisting of blocking a call and forwarding the call to voice mail in response to receiving the call from an unauthorized user while the communication resources are reserved.

20. The mobile station of claim 18, wherein the controller automatically terminates a call session on the mobile station in response to receiving a call from the at least one person while communication resources are reserved.

* * * * *